United States Patent [19]

Bell

[11] 4,160,430
[45] Jul. 10, 1979

[54] STRATIFIED CHARGE INTERNAL COMBUSTION ENGINE

[76] Inventor: John L. Bell, Rte. 1, P.O. Box 15, Severna Park, Md. 21146

[21] Appl. No.: 856,518

[22] Filed: Dec. 1, 1977

[51] Int. Cl.² ............................................. F02B 19/00
[52] U.S. Cl. ................................ 123/75 B; 123/32 B; 123/32 ST; 123/193 CH
[58] Field of Search ............... 123/75 B, 32 B, 32 ST, 123/32 SP, 79 C, 188 B, 188 C, 193 C, 193 CH, 193 H

[56] References Cited

U.S. PATENT DOCUMENTS

| 1,090,599 | 3/1914 | Cameron | 123/188 C |
| 1,090,991 | 3/1914 | Knight | 123/188 C |
| 3,408,992 | 11/1968 | Von Seggern et al. | 123/32 ST |
| 3,898,965 | 8/1975 | Fischer | 123/75 B |
| 3,924,590 | 12/1975 | Miyaki et al. | 123/193 H |
| 3,973,530 | 8/1976 | Seidel | 123/75 B |
| 4,004,557 | 1/1977 | Acker | 123/193 H |
| 4,036,184 | 7/1977 | Guenther | 123/32 SP |

Primary Examiner—Ira S. Lazarus
Attorney, Agent, or Firm—Schuyler, Birch, Swindler, McKie & Beckett

[57] ABSTRACT

An internal combustion engine is disclosed having a cylinder and a reciprocating piston which, together with the cylinder head, define the boundaries of a combustion chamber. A movable septum is supported by the cylinder head adjacent the combustion chamber for selectively dividing the combustion chamber into a first and second combustion chamber. The movable septum may be formed by a cylindrical plate or by a flat or curved plate which makes nominal contact with the walls of the cylinder and the face of the reciprocating piston to divide the combustion chamber. The fuel supply system provides a rich-fuel mixture through a rich mixture intake valve to the first combustion chamber, and a lean-fuel mixture through a lean mixture intake valve to the second combustion chamber. The movable septum tracks the movement of the reciprocating piston during the compression stroke to maintain the division between the first and second combustion chambers. However, just prior to the power stroke, the actuator retracts the movable septum from the combustion chamber, and the spark plug ignites the rich air-fuel mixture which then ignites the lean air-fuel mixture to complete the power stroke. During the exhaust stroke of the reciprocating piston, the movable septum is maintained in a retracted position. As a result, effective stratification is achieved between the first and second combustion chambers.

30 Claims, 11 Drawing Figures

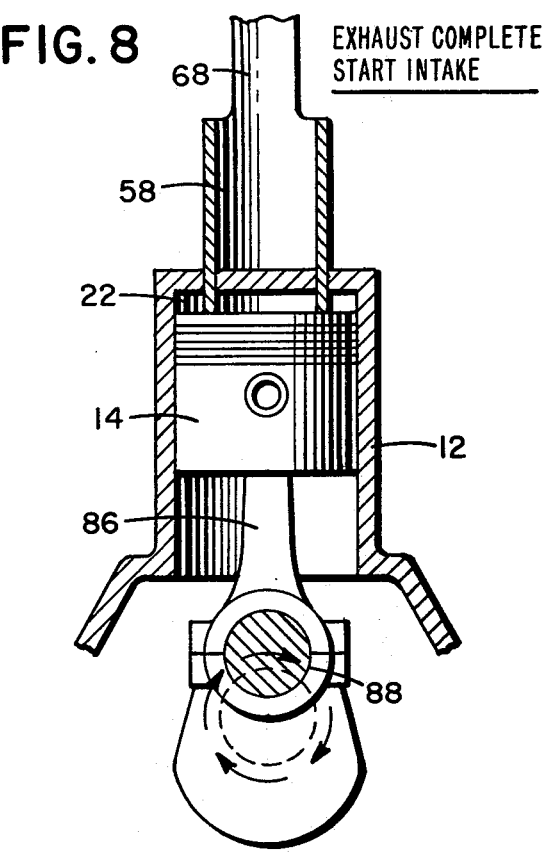
FIG. 8 — EXHAUST COMPLETE START INTAKE
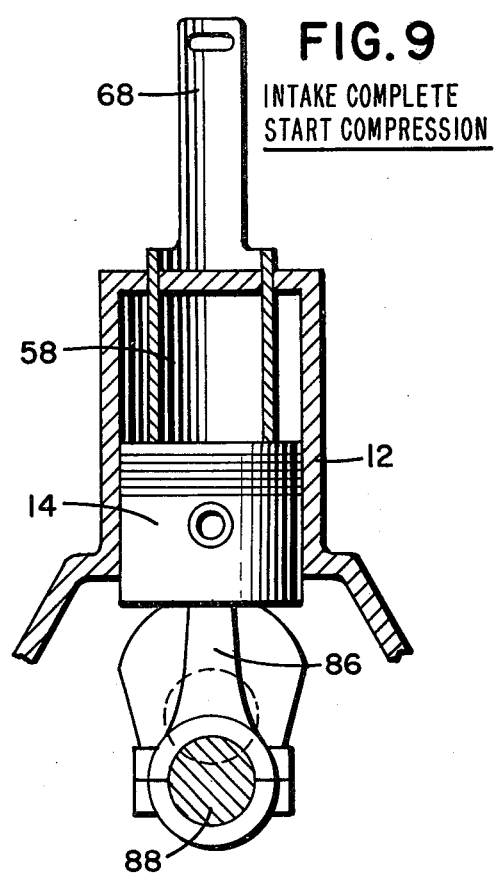
FIG. 9 — INTAKE COMPLETE START COMPRESSION
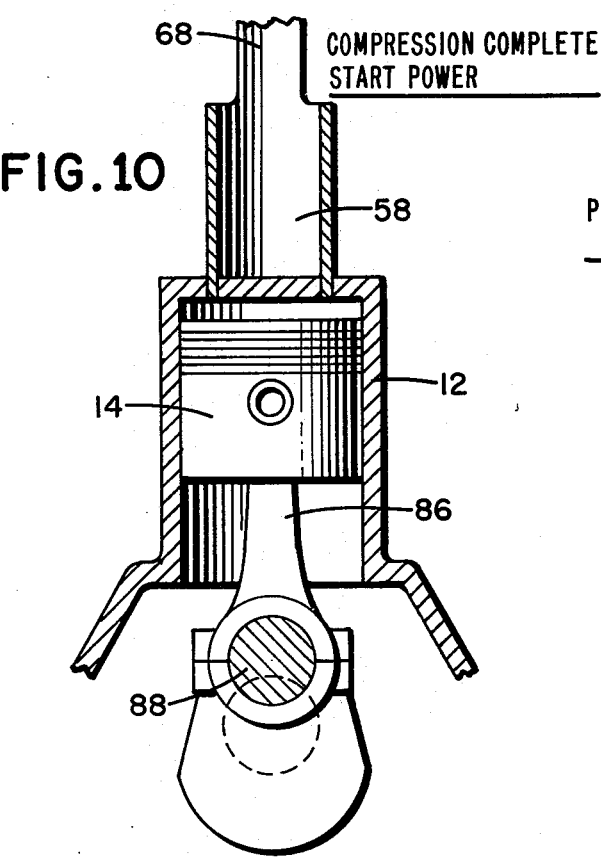
FIG. 10 — COMPRESSION COMPLETE START POWER
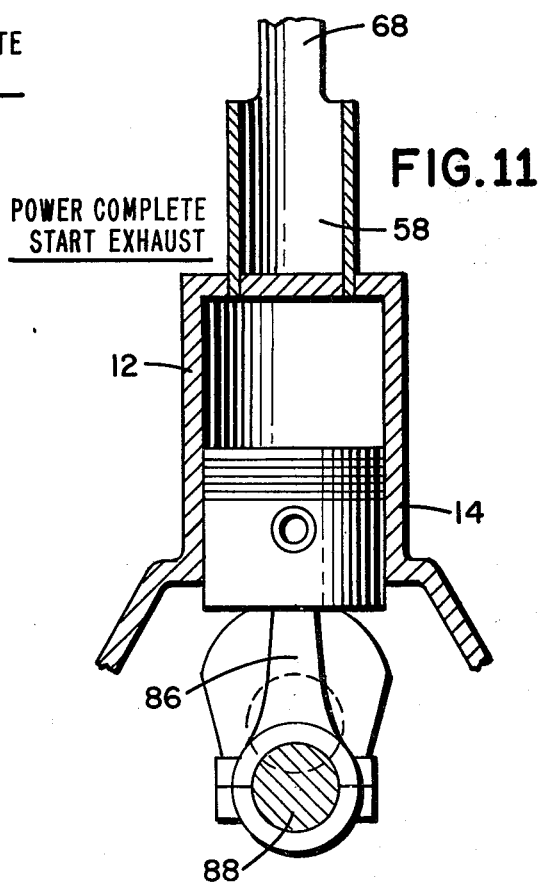
FIG. 11 — POWER COMPLETE START EXHAUST

STRATIFIED CHARGE INTERNAL COMBUSTION ENGINE

BACKGROUND OF THE INVENTION

1. Field of the Invention

The present invention relates generally to internal combustion engines and, more particularly, to an internal combustion engine having a stratified charge combustion chamber in which combustion is initiated by the ignition of a rich air-fuel mixture which in turn initiates ignition of a lean air-fuel mixture.

2. Description of the Prior Art

As a result of increasingly stringent governmental regulations regarding the content of exhaust gases emitted from internal combustion engines, various efforts are being made to control the amount of noxious components in engine emission and to improve fuel economy. Several different approaches to the solution of this problem are currently being investigated. One approach is to treat gases exhausted from an internal combustion engine by a catalytic converter or other device before the gases are released to the atmosphere. Another approach is to construct an internal combustion engine that will initially produce exhaust gases having a relatively low content of noxious components.

Recently, interest has increased in building internal combustion engines that utilize the charge stratification technique to reduce the contamination in engine exhaust gases. Charge stratification systems operate on the principle that the combustion of lean fuel mixtures produces lower emissions and good fuel economy. In a stratified charge internal combustion engine, the central principle is to supply a rich air-fuel mixture near the point of ignition inside the cylinder while the rest of the mixture in the combustion chamber is kept lean. For example, it is known to provide a four stroke cycle internal combustion engine with a main combustion chamber which contains a lean air-fuel mixture and an auxiliary or precombustion chamber connected with the main chamber by a restricted passage or orifice which contains a rich air-fuel mixture. The rich air-fuel mixture is supplied to this precombustion chamber through an additional intake valve while the lean air-fuel mixture is supplied to the main combustion chamber through the normal intake valve. In this engine combustion originates in the precombustion chamber and a jet of burning gases is then forced into the main combustion chamber. These burning gases ignite the lean mixture in the main combustion chamber thereby permitting the internal combustion engine to burn leaner fuel mixtures. Examples of such stratified charge internal combustion engines using a precombustion chamber in communication with a main combustion chamber are shown in several patents such as U.S. Pat. No. 3,941,105 issued to Yagi et al; U.S. Pat. No. 3,830,205 issued to Date et al; and U.S. Pat. No. 3,924,592 issued to Miyaki et al. The above patents generally describe the compound vortex controlled combustion engine (CVCC) manufactured by Honda Giken Kogyo Kabushiki Kaisha.

Although the above stratified charge internal combustion engines improve fuel economy and reduce pollutants, several disadvantages result therefrom. The addition of a fixed precombustion chamber increases the overall surface area of the combustion chamber. This results in an increase in the area subject to cooling which increases the likelihood of boundary layer quenching during the combustion process. Furthermore, the amount of control over the stratification of the charge in the combustion chamber is limited because the vortex or orifice between the precombustion chamber and the main combustion chamber always permits some degree of communication between the chambers. Also, in known stratified charge internal combustion engines the precombustion chamber must be limited in size in order to achieve sufficient compression of the air-fuel mixture in the precombustion chamber. This lack of control over the compression in the precombustion chamber decreases the efficiency of the combustion process and, because of this size limitation, the precombustion chamber has a large surface area per unit volume which increases the boundary layer problems mentioned above.

Several prior art attempts have been made to overcome the above disadvantages. For example, U.S. Pat. No. 3,929,107 issued to Renger and U.S. Pat. No. 4,011,841 issued to Sato et al show stratified charge internal combustion engines in which a homogeneous air-fuel mixture in a primary combustion chamber and a precombustion chamber is separately compressed and ignited. In these patents, an auxiliary piston mounted on the primary piston separately compresses the air-fuel mixture in the precombustion chamber. As a result, the compression in the precombustion chamber can be more precisely controlled during the compression stroke of the primary reciprocating piston. Although the auxiliary piston provides control over the compression in the precombustion chamber, at the point of ignition of the air-fuel mixture in the precombustion chamber there is no communication with the main combustion chamber and, as a result, part of the combustion process takes place solely in the precombustion chamber. Also, it is difficult in these systems to provide proper sealing between the auxiliary piston and the walls of the precombustion chamber. Finally, because these systems also use a separate precombustion chamber adjacent the main combustion chamber, the overall surface area of the combustion chamber is increased which results in the boundary layer problems mentioned above.

Another United States patent which shows a stratified charge internal combustion engine having an auxiliary piston for controlling the compression in the precombustion chamber is U.S. Pat. No. 3,777,724 issued to Kiley. The engine disclosed in the Kiley patent does not use a homogenous air-fuel mixture but rather uses a combination of rich and lean mixtures as generally known. In the Kiley patent, an auxiliary piston or volume control member mounted on the primary piston projects into and varies the volume of the precombustion chamber to maintain a constant predetermined ratio between the volumes of the main and precombustion chambers during a portion of the reciprocating movement of the primary piston. Again, although this auxiliary piston controls the compression in the precombustion chambers, it does not overcome the other disadvantages of known stratified charge internal combustion engines mentioned above.

SUMMARY OF THE INVENTION

The present invention is directed to an internal combustion engine that reduces exhaust pollutants and improves fuel economy by stratifying the charge in the combustion chamber of each cylinder of the engine. Stratification is accomplished by introducing a dividing septum vertically in the cylinder above the piston during the intake and compression strokes of the piston and removing it during the power and exhaust strokes. The technique of the present invention is used in a four stroke engine of usual design by modifications to the head, valves, manifolds and cam arrangement and, for overhead cam engine design, can be accomplished by modifications to the head gasket only. The vertical septum may take the form of a flat or curved plate which is movably mounted in a slot in the cylinder head. The plate is fitted to contact both the cylinder walls and the piston head to divide the space above the piston vertically into two chambers during the intake and compression strokes. The vertical septum is forced downward to contact and follow the piston during the intake stroke by an actuator device such as a spring, compressed air, hydraulic means, electric power means, or by direct gearing to the crank shaft. During the intake stroke, an intake valve and manifold deliver a rich air-fuel mixture to one of the chambers created by the vertical septum. An additional intake valve and manifold simultaneously deliver a lean air-fuel mixture or air to the other chamber created by the vertical septum. By proper proportioning of the sizes of these chambers and the sizes of the inlet valves, differentials in pressure in these chambers are kept to a minimum. By minimizing pressure differentials, significant gas transfer will not take place between the chambers and effective stratification is thereby achieved with only nominal pressures between the vertical septum and the piston head.

At the completion of the intake stroke both inlet valves close and, as the piston rises during the compression stroke, it forces the vertical septum upward through the slot in the cylinder head. In this manner, the rich mixture in one chamber and the lean mixture in the other chamber are both compressed to the same degree but are prevented from mixing by the presence of the vertical septum. At or a few degrees before the reciprocating piston reaches the top of the cylinder, the vertical septum is lifted entirely out of the combustion chamber. The septum can be lifted out of the combustion chamber by a cam mechanism or other equivalent device. Upon withdrawal of the septum, a spark plug located adjacent the portion of the combustion chamber containing the rich air-fuel mixture ignites this mixture before any appreciable transfer between the rich air-fuel mixture and the lean air-fuel mixture takes place. Exact sequencing of ignition and septum withdrawal depends on relative combustion chamber sizes, shapes, septum configuration and spark plug location. However, the septum probably should be withdrawn from the combustion chamber just prior to the initiation of the combustion process in order to protect it from combustion. With a strong flame front established in the rich air-fuel mixture, resulting pressure increases and turbulence will thoroughly mix the rich mixture with the lean mixture. The cam mechanism or other equivalent device which withdraws the septum at the beginning of the power stroke of the reciprocating piston locks the septum in the cylinder head during both the power and exhaust strokes. Finally, during the exhaust stroke, an exhaust valve opens and the combustion gases in the combustion chamber are exhausted in the usual manner.

As mentioned above, the vertical septum can be either a flat, curved, or corrugated plate movably mounted in the cylinder head. Different design criteria may indicate the use of a particular one of these vertical septums. However, the configuration of the vertical septum which apparently provides optimum performance is a cylindrical plate located centrally in the cylinder. Although this complicates head design by necessitating a plug in the cylinder head in the center of the cylindrical septum which contains an intake valve and the spark plug, this configuration does permit the location of the exhaust valve, the rich mixture intake valve and the lean mixture intake valve in a straight line for convenient operation by a single cam shaft. The cylindrical shape of the vertical septum also allows sealing of the septum in the head slot by use of piston rings and it eliminates the need for the septum to contact the cylinder walls as is required for a septum formed by a flat or curved plate. In this embodiment, the combustion process is initiated in the center of the cylinder and spreads to the lean air-fuel mixture surrounding the rich mixture. As a result, combustion of the lean air-fuel mixture is more complete and, due to the absence of any contact between the septum and the cylinder walls, boundary layer quenching during at least the initial part of the power stroke is further reduced.

It is therefore an object of the present invention to provide a stratified charge internal combustion engine in which stratification of the combustion chamber is achieved without increasing the surface area of the combustion chamber in order to prevent any increase in boundary layer quenching during the combustion process and to eliminate the need for any modification in the cooling arrangement of a standard internal combustion engine.

It is a further object of the present invention to provide a stratified charger internal combustion engine in which absolute time and volume control over the stratification of the combustion chamber is achieved up to the point of the initiation of combustion to thereby precisely control the combustion process.

Another object of the present invention is to provide a stratified charge internal combustion engine in which different fuel mixtures in different portions of the combustion chamber are compressed during the compression stroke of the reciprocating piston to improve the efficiency of the combustion process. In this regard, it is an object of the present invention to reduce the surface area per unit volume of a stratified charge internal combustion engine by forming the precombustion chamber in a portion of the main combustion chamber and to thereby permit a wide range of adjustment of the size of the precombustion chamber.

It is a further object of the present invention to provide a stratified charge internal combustion engine in which the entire combustion process occurs entirely within a single combustion chamber which is periodically divided to provide charge stratification. Also, it is an object of the present invention to improve the combustion efficiency of a stratified charge combustion chamber by initiating the combustion process in a rich air-fuel mixture located in the center of the cylinder which in turn ignites a surrounding lean air-fuel mixture.

Other objects, advantages and applications of the present invention will become apparent to those skilled in the art of internal combustion engines upon reading the accompanying description of the best mode contemplated for practicing the invention.

BRIEF DESCRIPTION OF THE DRAWINGS

FIGS. 8-11 show schematically the different positions of the vertical septum and the reciprocating piston of the preferred embodiment of the present invention shown in FIGS. 1-4 during the intake, compression, power and exhaust strokes of the reciprocating piston.

DETAILED DESCRIPTION OF THE PREFERRED EMBODIMENT

Figure 1:
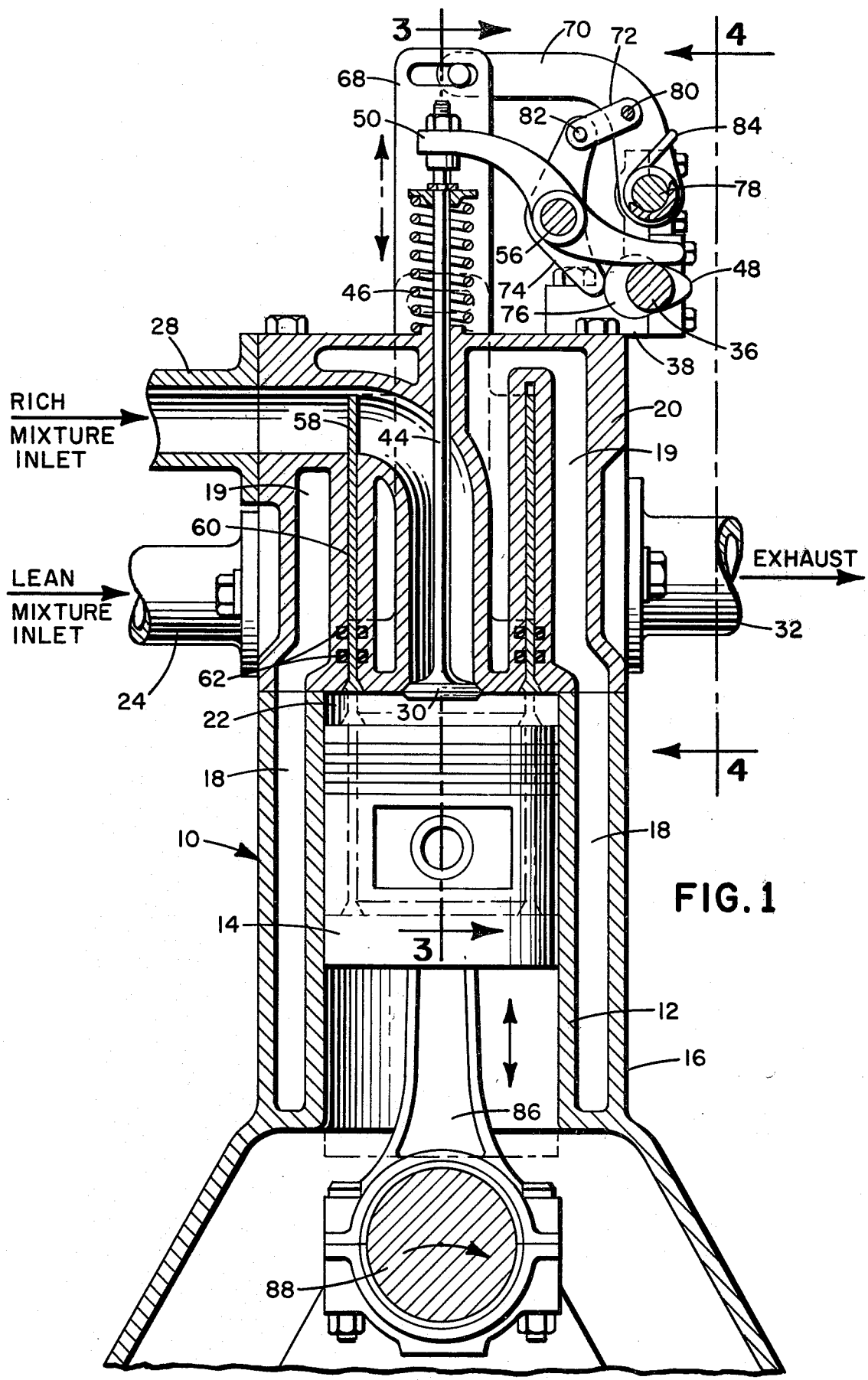
FIG. 1 is a vertical cross-section of a preferred embodiment of a stratified charge internal combustion engine according to the present invention taken along lines 1—1 of FIG. 2.

Referring now to the drawings and, in particular, to FIGS. 1-4, an internal combustion engine 10 is illustrated comprising a cylinder 12 which contains a reciprocating piston 14. The reciprocating piston 14 is a four stroke piston having intake, compression, power and exhaust strokes as generally known in the art. The cylinder 12 and the reciprocating piston 14 are supported by an engine block 16 which includes internal cooling chambers 18 for controlling the temperature of the internal combustion engine 10. A cylinder head 20 which includes cooling chambers 19 corresponding with the cooling chambers 18 in the engine block 16 is mounted on the cylinder 12 and the engine block 16. The top face of the reciprocating piston 14, the side walls of the cylinder 12 and the cylinder head 20 define the boundaries of the combustion chamber 22.

The cylinder head 20 includes a lean mixture inlet 24 which conducts a lean air-fuel mixture or air to the combustion chamber 22 through a conventional lean mixture inlet valve 26. Similarly, the cylinder head 20 includes a rich mixture inlet 26 which conducts a rich air-fuel mixture to the combustion chamber 22 through a conventional rich mixture inlet valve 30. An exhaust outlet 32 is also connected to the combustion chamber 22 through a conventional exhaust valve 34. The exhaust valve conducts combustion products or gases from the combustion chamber 22 during the exhaust stroke of the reciprocating piston 14.

Figure 2:
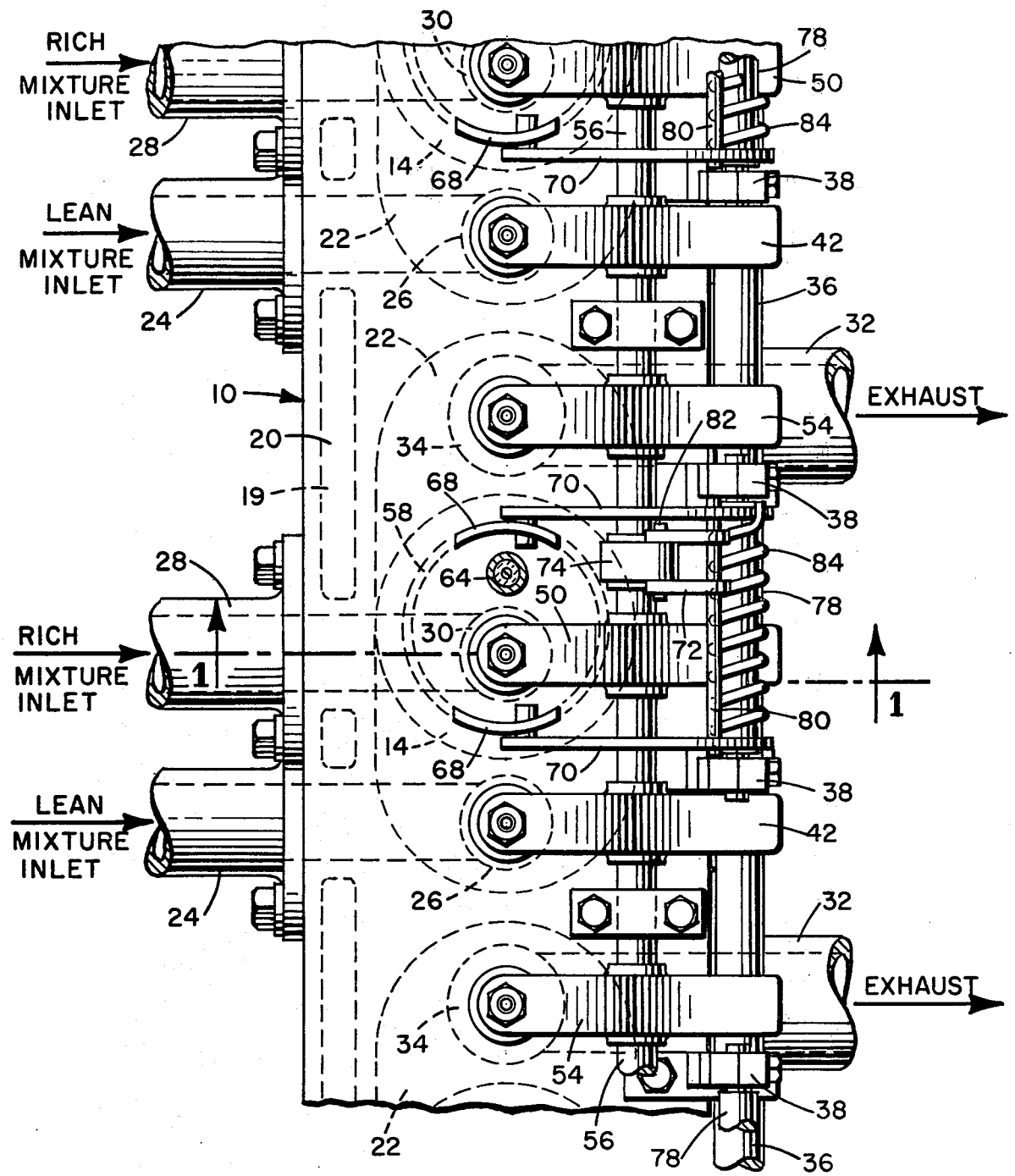
FIG. 2 is a top view of the preferred embodiment of a stratified charge internal combustion engine showing the arrangement of the valves, the vertical septum and a cam actuator mechanism, with the valve cover 66 omitted.
Figure 3:
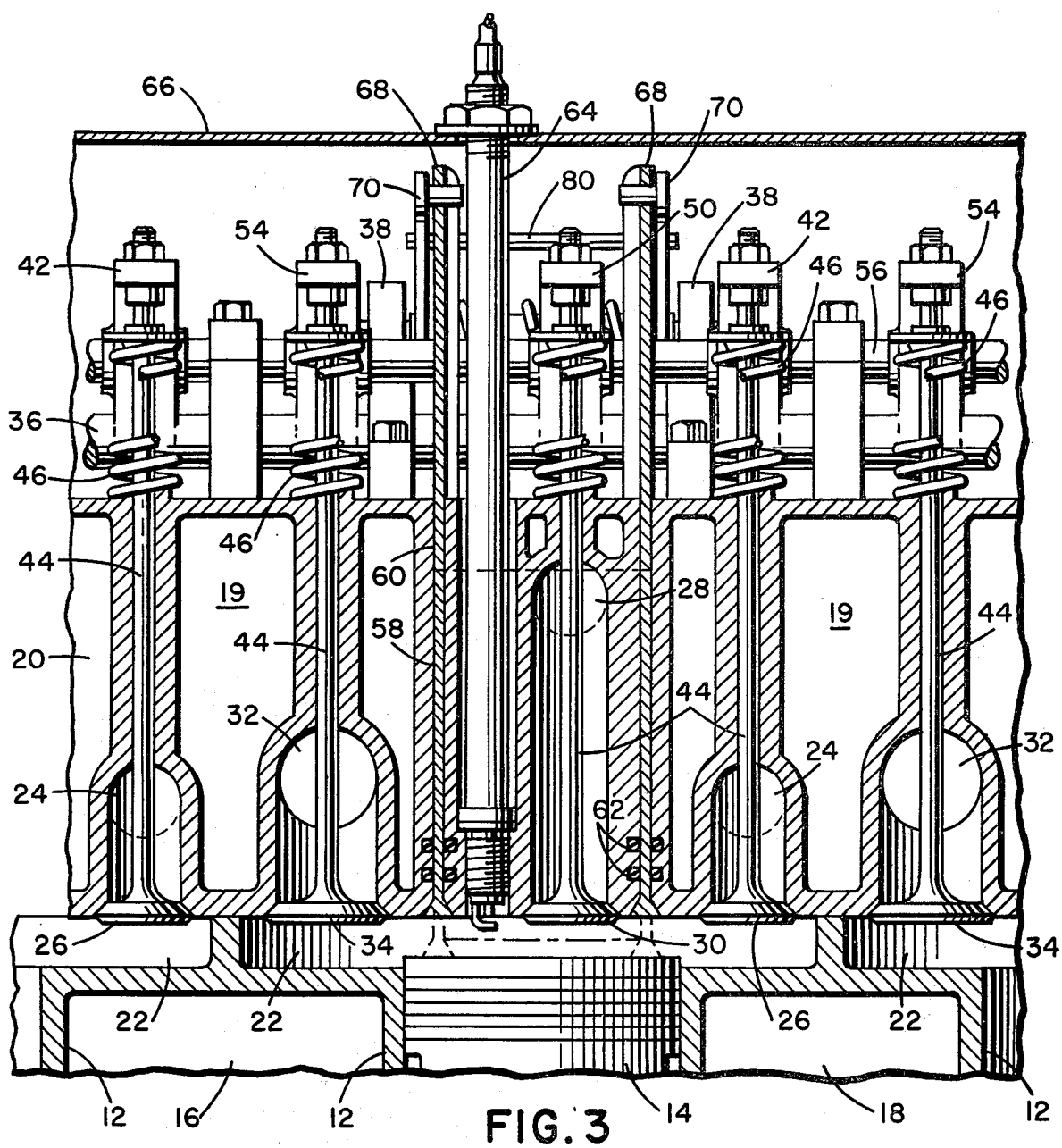
FIG. 3 is a vertical cross section taken along lines 3—3 of FIG. 1 showing the arrangement of the valves, the vertical septum and the spark plug of the stratified charge internal combustion engine of the present invention.
Figure 4:
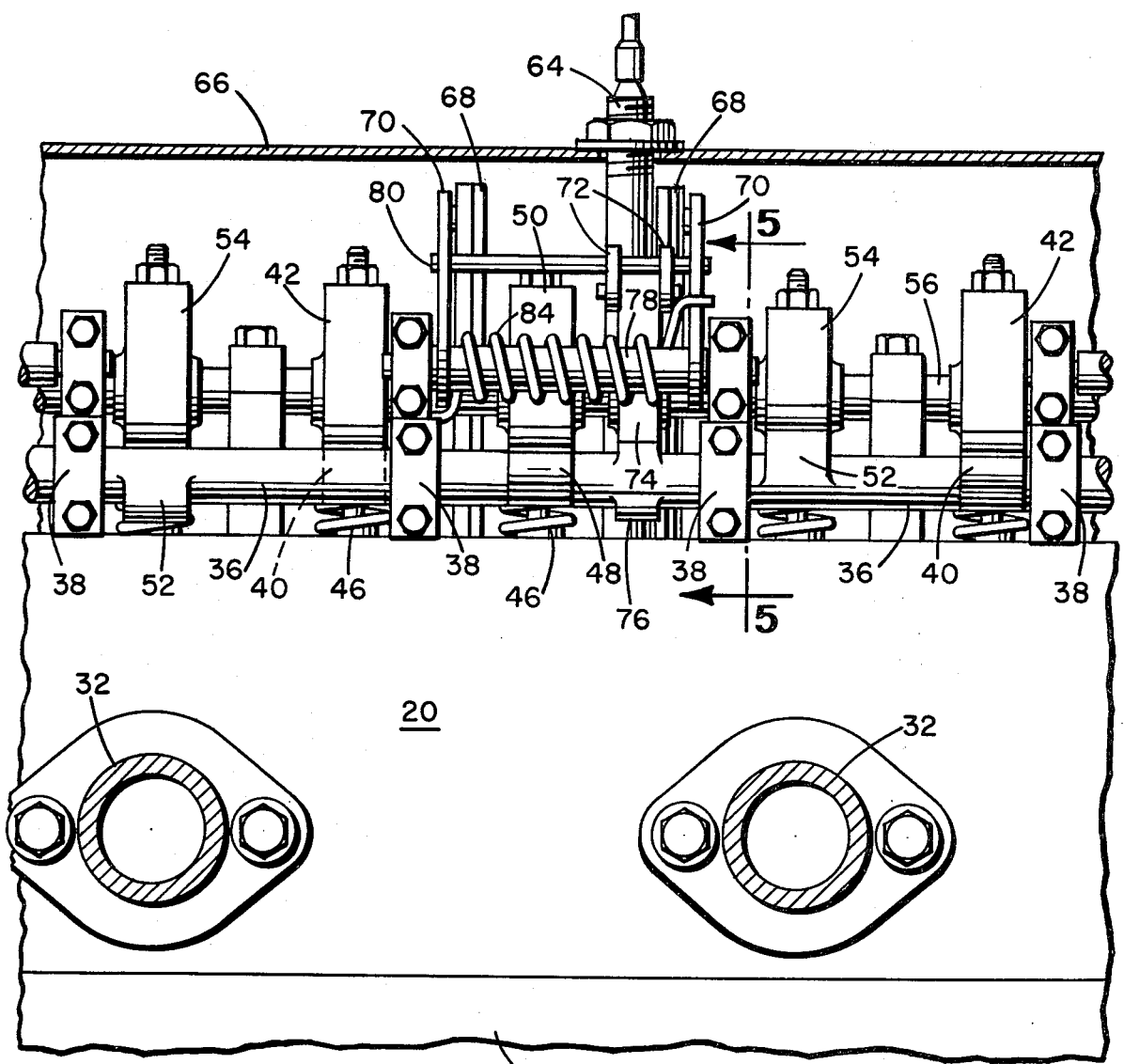
FIG. 4 is a side elevation of the engine looking in the direction indicated by the line 4—4 in FIG. 1.
Figure 5:
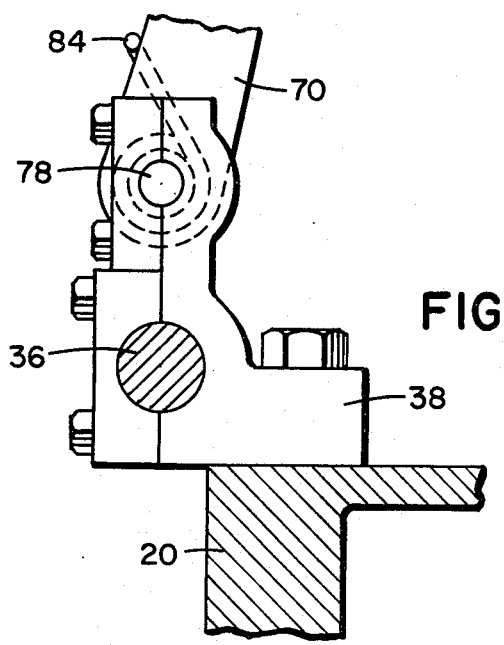
FIG. 5 is a partial cross sectional view taken along lines 5—5 of FIG. 4 showing a portion of the cam mechanism of the present invention.

The operation of the lean mixture inlet valve 26, the rich mixture inlet valve 30 and the exhaust valve 34 is controlled in a conventional manner by a cam mechanism. As shown in FIG. 2, these valves are arranged in a straight line to enable a single cam shaft 36 to control valve operation. The cam shaft 36 is mounted on the cylinder head 20 by cam shaft brackets 38 which are best illustrated in FIGS. 4 and 5. The cam shaft 36 includes a cam lobe 40 shown in FIG. 3 for selectively operating the lean mixture inlet valve 26 through a rocker arm assembly 42 which is attached to the lean mixture inlet valve 26 by a valve stem 44. Each of the valves 26, 30 and 34 includes a valve stem 44 together with a valve spring 46 as shown in FIG. 1. The cam lobe 40 associated with lean mixture inlet valve 26 actuates the rocker arm 42 to selectively open the lean mixture inlet valve 26 by compressing the valve spring 46. The valve spring 46 returns the lean mixture inlet valve 26 to its closed position as the cam shaft 36 and the cam lobe 40 continue to rotate. Similarly, a cam lobe 48 and a rocker arm assembly 50 are associated with the rich mixture inlet valve 30 to open and close the rich mixture inlet valve 30 upon rotation of the cam shaft 36 and the cam lobe 48. Finally, the exhaust valve 34 is associated with a cam lobe 52 and a rocker arm assembly 54 to selectively open and close the exhaust valve 34. These rocker arm assemblies 42, 50 and 54 are supported by a rocker arm support shaft 56 as shown in the drawings.

The combustion chamber 22 of the preferred embodiment is vertically divided by a cylindrical septum 58 which is mounted in cylindrical slot 60 in the cylinder head 20. The cylindrical septum 58 is selectively movable in the cylindrical slot 60 in a vertical direction to divide the combustion chamber 22 into a first combustion chamber enclosed by the cylindrical septum 58 and a second combustion chamber surrounding the cylindrical septum 58. The cylindrical septum 58 is sealed in the cylinder head 20 by septum sealing rings 62. These septum sealing rings 62 function in the same manner as conventional piston rings. As shown in the drawings, the cylindrical septum 58 encloses the rich mixture inlet valve 30 and the spark plug 64. The spark plug 64 ignites the rich air-fuel mixture supplied by the rich mixture inlet 28 and the rich mixture inlet valve 30 to the first portion of the combustion chamber 22 enclosed by the cylindrical septum 58. The spark plug is mounted in the cylinder head 20 and supported by valve cover 66 as shown in FIG. 3, and positively seals slot 60 during both power and exhaust strokes.

The cylindrical septum 58 moves in and out of the combustion chamber 22 in response to an actuator device such as the cam mechanism shown in FIGS. 1-4. The cylindrical septum 58 is connected to a pair of septum arms 68 which project above the cylinder head 20. Each of these septum arms 68 is connected to a septum lever 70 which is supported by a lever support shaft 78. A pair of linkages 72 are pivotably connected to the septum levers 70 by a shaft 80. These linkages 72 in turn are pivotably connected by shaft 82 to a septum cam follower 74 which is responsive to the rotation of the cam shaft 36 having a cam lobe 76. The rotation of the cam lobe 76 selectively activates the cylindrical septum 58. A septum lever spring 84 is mounted on the lever support shaft 78 and interconnected with the septum levers 70 to bias the septum levers 70 toward the dotted line position shown in FIG. 1. As shown therein, the septum lever spring 84 urges the cylindrical septum 58 toward its extended position shown in dotted lines in FIGS. 1 and 3. In its extended position, the cylindrical septum 58 abuts the top face of the reciprocating piston 14 to divide the combustion chamber 22 into a first and second combustion chamber. The rotation of the cam shaft 36 and the cam lobe 76 counteracts the biasing action of the septum lever spring 84 to withdraw the cylindrical septum 58 toward its retracted position inside the cylindrical slot 60 in the cylinder head 20. As shown in the drawings, in its retracted position, the cylindrical septum 58 is flush against the bottom of the cylinder head 20 and completely withdrawn from the combustion chamber 22.

Figure 6:
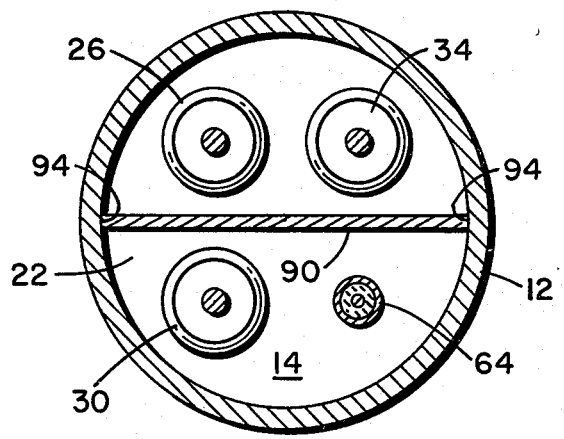
FIG. 6 shows a top view of a modified embodiment of the vertical septum of the present invention including the arrangement of the valves and the spark plug.
Figure 7:
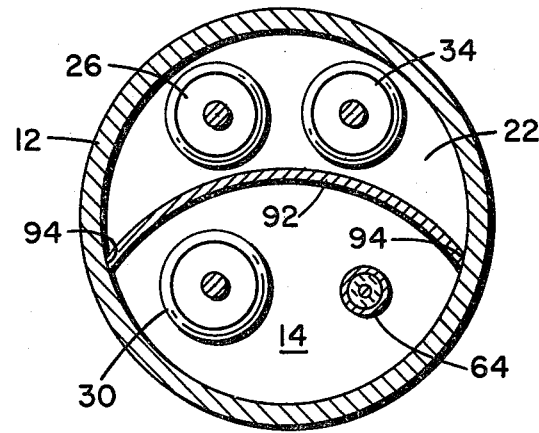
FIG. 7 shows another modification of the vertical septum of the present invention including the arrangement of the valves and the spark plug.

FIGS. 8-11 illustrate the operation of the cylindrical septum 58 of the preferred embodiment. The reciprocating piston 14 is connected by a connecting rod 86 to the crank shaft 88 in a conventional manner. The piston 14 is a four stroke conventional piston having intake, compression, power and exhaust strokes. At the completion of the exhaust stroke, the cylindrical septum 58 is in its retracted position in the cylindrical slot 60 in the cylinder head 20. At the start of the intake stroke of the piston 14, the septum lever spring 84 biases the cylindrical septum 58 against the top face of the piston 14 as shown in FIG. 8. In this position, the cylindrical septum 58 divides the combustion chamber 22 into a first combustion chamber inside the cylindrical septum 58 and a second combustion chamber surrounding the cylindrical septum 58. As shown in FIGS. 6 and 7, the cylindrical septum 58 is biased against the top face of the piston 14 throughout the intake and compression strokes. During the intake stroke, the cam mechanism opens the lean mixture inlet valve 26 and the rich mixture inlet valve 30 to permit a rich air-fuel mixture to enter the first combustion chamber and a lean air-fuel mixture to enter the second combustion chamber. At the end of the intake stroke, the cam mechanism closes the lean mixture inlet valve 26 and the rich mixture inlet valve 30 in preparation for the compression stroke. It is noted that the sizes of the cylindrical septum 58 and the inlet valves 26 and 30 can be selected to minimize the pressure differentials between the first and second combustion chamber. As a result, when the cylindrical septum 58 is withdrawn from the combustion chamber 22 at the end of the compression stroke, significant gas transfer will not take place between the first and second combustion chambers and effective stratification is thereby achieved. During the compression stroke, the reciprocating piston 14 forces the cylindrical septum upward through the septum slot 60 in the cylinder head 20 to compress the rich and lean air-fuel mixtures to the same degree. Then, at the start of the power stroke as illustrated in FIG. 10, the cylindrical septum 58 is withdrawn from the combustion chamber 22 by the rotation of the cam shaft 36 and the cam lobe 76. The cam lobe 76 actuates the septum cam follower 74 and the septum lever 70 which together counteract the action of the septum lever spring 84. Upon withdrawal of the cylindrical septum 58, the spark plug 64 located inside the cylindrical septum 58 and adjacent the rich air-fuel mixture ignites this mixture before any appreciable transfer between the rich and lean mixture takes place. The exact sequencing of the firing of the spark plug 64 and the withdrawal of the cylindrical septum 58 will depend on the relative sizes of the combustion chamber 22 and the cylindrical septum 58 as well as spark plug location. However, the cylindrical septum 58 probably should be withdrawn from the combustion chamber 22 just prior to the initiation of the combustion process in order to protect the cylindrical septum 58. The strong flame front established in the rich air-fuel mixture results in pressure increases and turbulence which thoroughly mix the burning gases in the center of the combustion chamber 22 with the surrounding lean air-fuel mixture. As shown in FIG. 11, the cylindrical septum 58 remains in its retracted position throughout the power and exhaust strokes of the reciprocating piston 14. During the power stroke, the crank shaft 88 is driven by the connecting rod 86 in a conventional manner and during the exhaust stroke the combustion gases in the combustion chamber are exhausted through the exhaust outlet 32 upon opening of the exhaust valve 34 by the cam mechanism.

Various modifications may be made in the septum of the present invention as illustrated in FIGS. 6 and 7. For example, as shown in FIG. 9, the septum may comprise a flat plate 90 which is mounted in a slot in the cylinder head 20 in a similar manner as the cylindrical septum 58 described above. A cam mechanism or other actuator device is provided to drive the flat plate septum 90 in the same manner. Similarly, the septum may be formed by a curved plate 92 as shown in FIG. 7. In both these embodiments, the septums 90 and 92 not only contact the top face of the reciprocating piston 14 but also must contact the cylinder walls 94 in order to effectively divide the combustion chamber 22. It is noted that the septums 90 and 92 simplify the design of the cylinder head 20 in that the need for a plug in the center of the cylindrical septum 58 is eliminated. However, unlike the cylindrical septum 58, these septums 90 and 92 do not initiate the combustion process in the center of the combustion chamber 22. Furthermore, the cylindrical septum 58 is preferred because it does not require any contact with the cylinder walls and thus prevents a certain amount of boundary layer quenching which may occur with the septums 90 and 92 shown in FIGS. 6 and 7.

Although illustrative embodiments of the invention have been described in detail with reference to the accompanying drawings, it is to be understood that the invention is not limited to those precise embodiments and that various changes and modifications may be effected therein by one skilled in the art without departing from the scope or spirit of the invention. For example, it is to be understood that various mechanisms may be used for moving the septum of the present invention such as compressed air, hydraulic means, electric power or direct gearing to the crank shaft. Similarly, different arrangements may be used for actuating the valves of the present invention. Furthermore, it is to be understood that the performance of the stratified charge internal combustion engine of the present invention may be optimized by variations in the timing and by different physical arrangements of the septum, the valves and the spark plug.

I claim:

1. A stratified charge internal combustion engine comprising:
 a cylinder;
 a piston mounting for reciprocating movement in said cylinder;
 a cylinder head mounted to overlie said cylinder, the combination of said cylinder head, the walls of said cylinder and a face of said piston forming a combustion chamber;
 dividing means supported by said cylinder head for dividing said combustion chamber into first and second combustion chambers;
 actuator means connected to said dividing means for moving said dividing means between a retracted position in said cylinder head and an extended position in said combustion chamber for dividing said combustion chamber;

fuel supply means mounted on said cylinder head for supplying a rich air-fuel mixture to said first combustion chamber and a lean air-fuel mixture to said second combustion chamber;

ignition means mounted on said cylinder head adjacent said first combustion chamber for igniting the rich air-fuel mixture in said first combustion chamber which in turn ignites the lean air-fuel mixture in said second combustion chamber to drive said reciprocating piston.

2. The internal combustion engine defined in claim 1 wherein said dividing means comprises a flat plate mounted in a slot in said cylinder head, said flat plate being fitted to contact the walls of said cylinder and the head of said reciprocating piston during its extended position to vertically divide said combustion chamber into said first and second combustion chambers.

3. The internal combustion engine defined in claim 1 wherein said dividing means comprises a curved plate mounted in a slot in said cylinder head, said curved plate being fitted to contact the walls of said cylinder and the head of said reciprocating piston during its extended position to vertically divide said combustion chamber into said first and second combustion chambers.

4. The internal combustion engine defined in claim 1 wherein said dividing means comprises a hollow cylindrical plate mounted in a cylindrical slot in said cylinder head, said hollow cylindrical plate being fitted to contact the head of said reciprocating piston during its extended position to vertically divide said combustion chamber into said first and second combustion chambers.

5. The internal combustion engine defined in claim 4 wherein said hollow cylindrical plate is centrally located in said cylinder.

6. The internal combustion engine defined in claim 4 further comprising sealing rings mounted in said cylindrical slot in said cylinder head for sealing said hollow cylindrical plate in said cylinder head.

7. The internal combustion engine defined in claim 4 further comprising exhaust means mounted on said cylinder head for exhausting combustion products from said combustion chamber.

8. The internal combustion engine defined in claim 7 wherein said exhaust means comprises an exhaust valve and said fuel supply means comprises a rich mixture intake valve and a lean mixture intake valve, said exhaust valve, said rich mixture intake valve and said lean mixture intake valve being mounted in a straight line on said cylinder head.

9. The internal combustion engine defined in claim 8 wherein said actuator means comprises a single cam shaft and a plurality of cam lobes mounted thereon for actuating said dividing means, said exhaust valve, said rich mixture intake valve and said lean mixture intake valve.

10. The internal combustion engine defined in claim 7 wherein said reciprocating piston is a four stroke piston having intake, compression, power and exhaust strokes and said actuator means comprises biasing means for biasing said hollow cylindrical plate to its extended position during the intake stroke of said reciprocating piston, said fuel supply means supplying the rich and lean air-fuel mixtures to said first and second combustion chambers respectively during the intake stroke of said reciprocating piston.

11. The internal combustion engine defined in claim 10 wherein said biasing means biases said hollow cylindrical plate against said reciprocating piston to divide said combustion chamber during the compression stroke of said reciprocating piston.

12. The internal combustion engine defined in claim 11 wherein said biasing means is a spring.

13. The internal combustion engine defined in claim 11 wherein said actuator means further comprises retraction means for moving said hollow cylindrical plate to its retracted position just prior to the power stroke of said reciprocating piston, said retraction means maintaining said hollow cylindrical plate in its retracted position during the power and exhaust strokes of said reciprocating piston, said ignition means igniting the rich air-fuel mixture in said first combustion chamber during the power stroke of said reciprocating piston.

14. The internal combustion engine defined in claim 13 wherein said retraction means comprises cam means, said cam means being further connected to said fuel supply means and said exhaust means to control the operation of said fuel supply means and said exhaust means.

15. The internal combustion engine defined in claim 1 wherein said reciprocating piston is a four stroke piston having intake, compression, power and exhaust strokes and said actuator means comprises tracking means for enabling said dividing means to track the movement of said reciprocating piston during the intake and compression strokes of said reciprocating piston, said fuel supply means supplying the rich and lean air-fuel mixtures to said first and second combustion chambers respectively during the intake stroke of said reciprocating piston.

16. The internal combustion engine defined in claim 15 wherein said tracking means comprises spring means.

17. The internal combustion engine defined in claim 15 wherein said actuator means further comprises retraction means for moving said dividing means to its retracted position just prior to the power stroke of said reciprocating piston, said retraction means maintaining said dividing means in its retracted position during the power and exhaust strokes of said reciprocating piston, said ignition means igniting the rich air-fuel mixture in said first combustion chamber during the power stroke of said reciprocating piston.

18. The internal combustion engine defined in claim 17 wherein said retraction means comprises cam means, said cam means being further connected to said fuel supply means to control the operation of said fuel supply means.

19. The internal combustion engine defined in claim 18 wherein said fuel supply means comprises a rich mixture intake valve for supplying rich air-fuel mixture to said first combustion chamber and a lean mixture intake valve for supplying lean air-fuel mixture to said second combustion chamber, said cam means controlling the operation of said rich mixture intake valve and said lean mixture intake valve.

20. The internal combustion engine defined in claim 1 wherein said fuel supply means and said dividing means are arranged to minimize pressure differentials between said first and second combustion chambers.

21. In an internal combustion engine having a cylinder and a cylinder head mounted thereon, said cylinder containing a four stroke reciprocating piston having intake, compression, power and exhaust strokes, said cylinder, said cylinder head and said reciprocating piston forming a combustion chamber, a movable septum for dividing said combustion chamber into first and second combustion chambers, septum moving means for selectively moving said septum to divide said combustion chamber, fuel supply means for supplying different fuel mixtures to said first and second combustion chambers and ignition means for igniting the different fuel mixtures in said first and second combustion chambers.

22. An internal combustion engine according to claim 21 wherein said movable septum comprises a flat plate mounted in a slot in said cylinder head for vertical movement from a retracted position in said cylinder head to an extended position, said flat plate being fitted to contact the walls of said cylinder and the head of said reciprocating piston during its extended position to vertically divide said combustion chamber.

23. An internal combustion engine according to claim 21 wherein said movable septum comprises a curved plate mounted in a slot in said cylinder head for vertical movement from a retracted position in said cylinder head to an extended position, said curved plate being fitted to contact the walls of said cylinder and the head of said reciprocating piston during its extended position to vertically divide said combustion chamber.

24. An internal combustion engine according to claim 21 wherein said movable septum comprises a hollow cylindrical plate mounted in a cylindrical slot in said cylinder head for vertical movement from a retracted position in said cylinder head to an extended position, said hollow cylindrical plate being fitted to contact the head of said reciprocating piston during its extended position to vertically divide said combustion chamber.

25. An internal combustion engine according to claim 21 wherein said septum moving means comprises tracking means to move said septum to divide said combustion chamber during the intake stroke of said reciprocating piston, said fuel supply means supplying a rich air-fuel mixture to said first chamber and a lean air-fuel mixture to said second chamber during the intake stroke of said reciprocating piston.

26. An internal combustion engine according to claim 25 wherein said tracking means further enables said septum to track the movement of said reciprocating piston during the compression stroke of said reciprocating piston.

27. An internal combustion engine according to claim 26 wherein said septum moving means further comprises retraction means for retracting said septum from said combustion chamber to a retracted position just prior to the power stroke of said reciprocating piston, said retraction means maintaining said septum in its retracted position for the duration of the power and exhaust strokes of said reciprocating piston.

28. An internal combustion chamber according to claim 27 wherein said ignition means comprises a spark plug supported by said cylinder head adjacent said first combustion chamber for igniting the rich air-fuel mixture in said first combustion chamber after said septum is retracted from said combustion chamber to thereby ignite the lean air-fuel mixture in said combustion chamber and power said reciprocating piston.

29. In an internal combustion engine having a combustion chamber formed by the combination of a cylinder, a cylinder head and a four stroke reciprocating piston contained in said cylinder, said reciprocating piston having intake, compression, power and exhaust strokes, a method for stratifying the charge in said combustion chamber comprising the steps of:
introducing a movable septum into said combustion chamber at the start of the intake stroke of said reciprocating piston to divide said combustion chamber into first and second combustion chambers;
supplying a rich air-fuel mixture to said first combustion chamber and a lean air-fuel mixture to said second combustion chamber during the intake stroke of said reciprocating piston;
compressing both the rich and lean air-fuel mixtures in said first and second compression chambers respectively during the compression stroke of said reciprocating piston;
withdrawing said movable septum from said combustion chamber to a retracted position just prior to the power stroke of said reciprocating piston;
igniting the rich air-fuel mixture in said first combustion chamber to start the power stroke of said reciprocating piston which in turn ignites the lean air-fuel mixture in said second combustion chamber; and
retaining said movable septum in its retracted position during the power and exhaust strokes of said reciprocating piston.

30. The method set forth in claim 30 further comprising the additional step of equalizing the pressure in said first and second chambers during the intake and compression strokes of said reciprocating piston.

* * * * *